Feb. 28, 1939.  H. W. LANDENBERGER  2,149,143
PUMP OR MOTOR
Filed Oct. 31, 1936   3 Sheets-Sheet 3

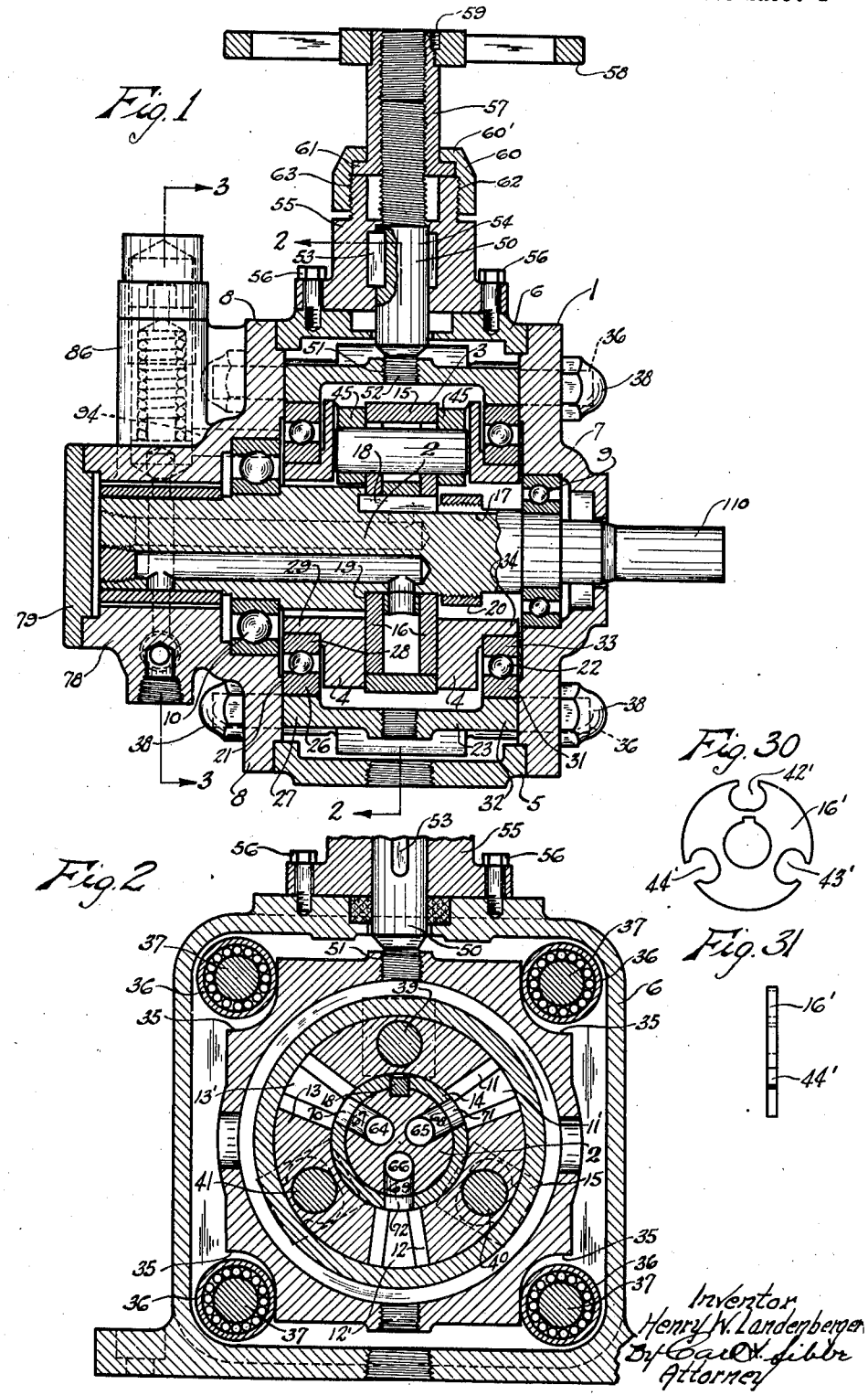

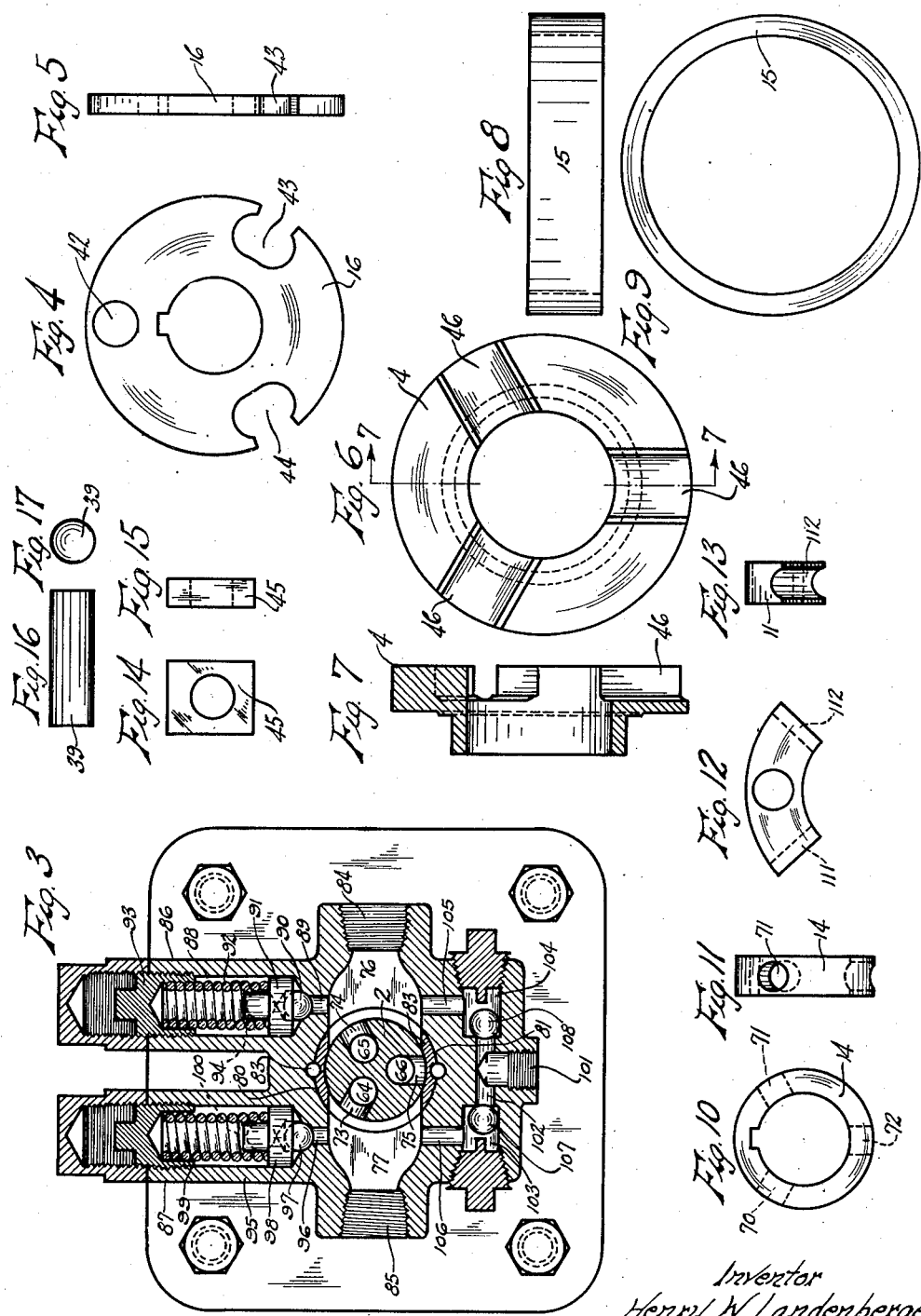

Inventor
Henry W. Landenberger
By Carl A. Libbi
Attorney

Patented Feb. 28, 1939

2,149,143

UNITED STATES PATENT OFFICE 2,149,143

PUMP OR MOTOR

Henry W. Landenberger, Philadelphia, Pa., assignor to American Engineering Company, Philadelphia, Pa., a corporation of Pennsylvania Application October 31, 1936, Serial No. 108,596

7 Claims. (Cl. 103—129)

This invention relates to fluid pumps and motors, and more particularly to pumps and motors of the variable stroke type.

One object of the present invention is to provide a new and useful pump or motor of the rotary type wherein the plunger or pumping elements thereof operate in a path concentric with the center of rotation of said pump or motor. By such an arrangement of plungers, highest efficiencies are assured since no energy losses occur between the plungers and the driving means therefor during operation of the pump or motor, as is the case in many of the prior constructions.

Another object is to provide a pump or motor having a series of double-acting plunger or pumping elements.

Another object is to provide a pump or motor construction wherein the central distributing valve thereof and the unit carrying the pumping elements are integrally connected and rotate about a common axis.

Another object is to provide a pump or motor construction wherein the stroke of the pumping elements is relatively great as compared with the degree of adjustment of the stroke control elements whereby maximum capacities are obtained for each degree of eccentricity of said stroke control elements.

A further object is to provide a pump or motor wherein a perfect guide is maintained for the pumping elements under all conditions of operation.

A still further object is to provide a novel and simplified pump or motor which is comprised of a few parts, and which insures maximum efficiencies under all conditions of operation.

Other and further objects will become apparent as the description of the invention progresses.

Of the drawings:

Fig. 1 is a sectional, elevational view showing the internal construction of the pump or motor comprising the present invention.

Fig. 2 is a sectional view taken substantially along line 2—2 of Fig. 1.

Fig. 3 is a sectional view taken substantially along line 3—3 of Fig. 1.

Figs. 4 and 5 are side and end views respectively, of one of the operating plates for the plunger or pumping elements.

Fig. 6 is a detail view showing the inner face of one of the stroke adjusting plates for the pumping elements.

Fig. 7 is a sectional view taken substantially along line 7—7 of Fig. 6.

Figs. 8 and 9 are plan and end views respectively, of the outer ring enclosing the pumping elements.

Figs. 10 and 11 are end and side views respectively of the inner ring upon which the pumping elements are supported, showing the ports therein which communicate with the ports of the central valve.

Figs. 12 and 13 are side and end views respectively, of one of the pumping elements.

Figs. 14 and 15 are side and end views respectively, of one of the stroke adjusting shoes for the pumping elements.

Figs. 16 and 17 are side and end views respectively, of one of the pins which connects the pumping elements with the stroke adjusting elements and the operating means therefor.

Figure 18:
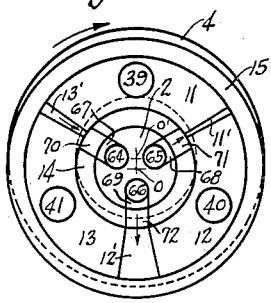

Figs. 18 to 23 inclusive are diagrammatic views illustrating the operation of my novel pump or motor construction when the stroke adjusting plates are moved to one position from a neutral position.

Figs. 24 to 29 inclusive are similar diagrammatic views illustrating the operation of my improved pump or motor construction when the stroke adjusting plates are actuated to an opposite position from neutral, and Figs. 30 and 31 are side and end views respectively, of an operating plate of an alternative construction.

Referring to the drawings, the numeral 1 indicates the pump or motor comprising the present invention, which consists generally of a central distributing valve 2, a plunger or pumping unit 3, and a pair of stroke adjusting plates 4, 4, mounted within a casing 5. Casing 5 comprises an outer, substantially square casing member 6 and a pair of end plates 7 and 8. The central valve 2 is mounted for rotation in ball bearings 9 and 10 provided respectively in end plates 7 and 8. Pumping unit 3 comprises a series of plungers or pumping elements 11, 12 and 13, inner and outer rings 14 and 15 respectively, and a pair of operating plates 16, 16 for said plungers. Inner ring 14 and the operating plates 16, 16 are secured to the reduced portion 17 of central valve 2 by means of a key 18. As shown in Fig. 2, the inner and outer surfaces of plungers 11, 12 and 13 are concentric with rings 14 and 15, and, in assembly, lie in substantially abutting relation with the outer and inner peripheries respectively, of said rings. As shown in Fig. 1, the plungers have substantially the same width as inner ring 14, and the side surfaces thereof lie in substantially abutting relation with the inner surfaces of operating plates 16, 16. A slight clearance is provided between plungers 11, 12 and 13, and rings 14 and 15 and plates 16, 16, to permit relative movements of said plungers. This clearance, however, is very slight so that no appreciable leakage occurs past the plungers. The outer peripheries of operating plates 16, 16 are also confined within ring 15. Pumping unit 3 is held against axial movement by means of an annular shoulder 19 on central valve 2, which engages the plate 16 disposed to the left (Fig. 1) of the pumping elements and by an internally threaded collar 20 secured to the threaded portion of central valve 2, which engages the outer side of the operating plate 16 disposed to the right of the pumping elements, as shown in Fig. 1.

The stroke adjusting plates 4, 4 are mounted for rotation in ball bearings 21 and 22 respectively, provided in a sliding block 23, and the inner faces thereof lie in substantially abutting relation with the outer sides of plates 16, 16 and ring 15. The outer race 26 of ball bearing 21 is secured to the circular internal flange 27 of sliding block 23, while the inner race 28 thereof is secured to the hub portion 29 of the stroke adjusting plate 4 disposed to the left of the pumping unit. The outer race 31 of roller bearing 22 is mounted on the circular, inwardly extending flange 32 of sliding block 23, while the inner race 33 is secured to the hub portion 34 of the stroke adjusting plate 4 disposed to the right of pumping unit 3. Sliding block 23 is provided with a substantially arcuate recess 35 at each corner thereof, as shown in Fig. 2, and is guided for vertical movement between roller bearings 36 disposed adjacent said recesses 35. The upper and lower roller bearings 36 are so spaced as to permit full stroking of the pump in either direction from a neutral position. Roller bearings 36 are mounted on bolts 37 which extend through end plates 7 and 8 of the casing 5 and have nuts 38 provided at the opposite ends thereof, which, when tightened, securely retain said end plates in engagement with casing member 6. Any suitable gasket or packing material may be provided between the end plates and the sides of casing member 6 to prevent leakage of fluid therebetween. As shown more clearly in Figs. 1 and 2, the pumping elements 11, 12 and 13 have extending through apertures provided therein, pins 39, 40 and 41 respectively. These pins also extend through recesses 42, 43 and 44 provided in operating plates 16, 16, and terminate at the opposite ends thereof in the central bores of shoes 45, 45, which operate in the open radial slots 46, 46, provided in the inner faces of the stroke adjusting plates 4, 4 respectively.

As pointed out before, the stroke adjusting plates 4, 4 are mounted in bearings provided in sliding block 23, and consequently upon movement of the sliding block from a neutral position, the stroke adjusting plates will be actuated to a position eccentric with the center of rotation of central valve 2, and pumping unit 3. However, owing to the fact that the pins 39, 40 and 41 are connected to the shoes 45, 45 mounted in the radial slots 46, 46 of plate 4, 4, the latter will be rotated simultaneously and in the same direction as central valve 2, and the pumping unit 3 secured thereto.

As shown more clearly in Figs. 2 and 4, pin 39 neatly fills the slots 42 in driving plates 16, 16, while the slots 43 and 44 are extended to permit relative movement between the pins 40 and 41 operating respectively therein, and said plates. By this arrangement driving of the pumping elements 11, 12 and 13, and of the stroke adjusting plates 4, 4 by the plates 16, 16 is effected through the pin 39.

It therefore is seen that when plates 4, 4 are adjusted in either direction from their normal position, they will rotate about a fixed center which is eccentric with that of central valve 2 and pumping unit 3, and as a result relative movements will be imparted to plungers 12 and 13 by the shoes 45, 45. Thus the angular velocities of plungers 12 and 13 are greater than that of the control valve and parts secured thereto during portions of a complete rotation thereof and less than that of the central valve and associated parts during other portions of a complete rotation. Inasmuch as plunger 11 is held against relative movement, it will travel at the same angular velocity as the central valve 2. Fig. 2 shows the position of the parts when the stroke adjusting plates 4, 4 are in neutral position, or in a position concentric with that of central valve 2 and the parts secured thereto. However, when plates 4, 4 are actuated by sliding block 23 to a position either above or below this neutral position, it is clear that the chordal distances between pins 39, 40 and 41 will vary, and consequently the volumes of the chambers 11', 12' and 13' disposed between pumping elements 11, 12 and 13 will also vary accordingly. As shown, the pins 39, 40 and 41 are located at 120 degrees apart and the pumping elements 11, 12 and 13 carried thereby are so disposed that when the stroke adjusting plates 4, 4 are eccentrically adjusted with respect to central valve 2, the movement of any two of said pumping elements with respect to each other will be away from each other during substantially 180 degrees of movement of central valve 2, whereby, as will be hereinafter more fully described, suction occurs, and during the remaining substantially 180 degrees of movement said pumping elements will move toward each other to discharge the fluid drawn therebetween during the said first 180 degrees of movement.

Sliding block 23, as shown in Figs. 1 and 2, is actuated by means of a screw shaft 50. This shaft is provided with a reduced threaded portion 51 at the lower end thereof which is secured in the internally threaded bore 52 provided in the upper wall of sliding block 23. Screw shaft 50 is held against rotary movement by means of a key 53 engaging in longitudinally aligned slots provided respectively in the enlarged portion 54 of said shaft, and in the internal wall of a bracket 55 through which the shaft extends. Bracket 55 is secured to the upper wall of casing member 6 in any suitable manner, such as by bolts 56. Screw shaft 50 is actuated by means of a nut 57 secured to a hand wheel 58 in any suitable manner, such as by a locking screw 59. Nut 57 is held against axial movement by an annular flange 60' provided at the upper end of a lock nut 60 which engages the annular flange 61 provided at the lower end of nut 57. Lock nut 60 is provided with an internally threaded portion 62 which engages the upper reduced threaded portion 63 of bracket 55, and may thus be adjusted to the proper position. Thus, to adjust sliding block 23 it is only necessary to turn hand wheel 58 in the proper direction, which through nut 57 imparts an axial movement to screw shaft 50.

Referring to Figs. 1 and 2, it will be observed that central valve 2 is provided with three longitudinal passages 64, 65 and 66 extending from substantially the left hand end thereof to points substantially intermediate its right and left hand ends. These passages are arranged at 120 degrees apart and the right hand ends thereof terminate in radially disposed ports 67, 68 and 69, respectively. Ports 67, 68 and 69 register with ports 70, 71 and 72 provided respectively in the inner ring 14, which in turn communicate with the chambers 11', 12' and 13' disposed between plungers 11, 12 and 13. The left hand ends of passages 64, 65 and 66 communicate with radially extending ports 73, 74 and 75. Each of the ports 73, 74 and 75, during a complete revolution of central valve 2, communicates alternately with chambers 76 and 77 provided at the left hand end 78 of end plate 8. To prevent leakage of fluid past the left hand end of the central valve 2, any suitable cap 79 is provided. As shown in Fig. 3, sealing plates 80 and 81 engage the upper and lower sides respectively of central valve 2, and are held in position by any suitable means, such as by circular keys 83. These sealing plates are provided to prevent leakage of fluid between chambers 76 and 77 during operation of the pump or motor and act as shut off valves for the ports 73, 74 and 75 during the transition thereof from pressure to suction, or from suction to pressure, as the case may be. During operation of the pump or motor, fluid enters or discharges from chambers 76 and 77, as the case may be, through ports 84 and 85 respectively. When the device operates as a pump, ports 84 and 85 may be connected by piping to a motor or other apparatus which is to be operated thereby, and when operating as a motor, ports 84 and 85 may be connected to the pump or other apparatus supplying fluid under pressure.

In order to prevent excessive pressures in the system, chambers 76 and 77 have connected thereto relief valves 86 and 87 respectively. Relief valve 86 consists of a cylinder 88 which communicates with chamber 76 through a reduced passage 89. A ball valve 90 engages a valve seat provided at the upper end of passage 89 and is normally held in seated position by a piston 91, which is urged downwardly by a spring 92 extending between the upper end of said piston and an adjustable spring seat 93, which makes threaded engagement with the upper end of cylinder 88. A passage 94 provided in end plate 8 connects cylinder 88 with the interior of the pump. As shown in Figs. 1 and 3, piston 91 and valve 90 normally prevent the passage of fluid from chamber 76 to passage 94.

From the foregoing description it is seen that in the event the pressure in chamber 76 exceeds the pressure of spring 92, valve 90 and piston 91 will be moved upwardly, thereby establishing communication between chamber 76 and passage 94. The pressure of spring 92 may be varied by simply adjusting valve seat 93.

Relief valve 87 is of similar construction and also consists of a cylinder 95 terminating at the lower end thereof in a reduced passage 96 which establishes communication between chamber 77 and cylinder 95. A valve 97 normally closes the upper end of passage 96 and is held in position by a piston 98 which is urged downwardly by a spring 99. A passage 100 provided in end plate 8 establishes communication between cylinder 95 and the interior of pump 1. Thus, when the pressure in chamber 77 exceeds a predetermined value, valve 97 and piston 98 will be urged upwardly thereby permitting fluid from chamber 77 to discharge into the interior of the pump casing through passage 100.

Makeup fluid may be drawn into the system through a port 101, which may be connected to any suitable source of fluid supply (not shown). The upper end of port 101 communicates with a transversely extending passage 102 having enlarged portions 103 and 104 provided at the opposite ends thereof. Portion 104 is connected to chamber 76 by a communicating passage 105, while portion 103 is connected to chamber 77 by a communicating passage 106. Ball valves 107 and 108 are provided at the opposite ends of passage 102. Thus, when chamber 76 is subjected to pressure, and chamber 77 to suction, valve 108 will be held upon its seat, while makeup fluid may pass through port 101, passage 102, enlarged portion 103, communicating passage 106, and thence into chamber 77. On the other hand, when chamber 77 is subjected to pressure, and chamber 76 to suction, valve 107 is held upon its seat and makeup fluid may enter chamber 76 through port 101, passage 102, enlarged portion 104 and communicating passage 105.

To better understand the operation of my novel pump and motor construction, a brief résumé of the operation thereof will now be given in connection with the diagrammatic views shown in Figs. 18 to 29 inclusive.

Figure 19:
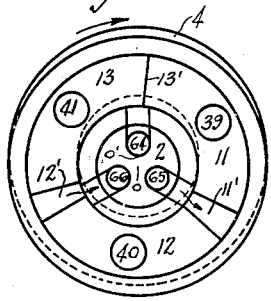
Figure 20:
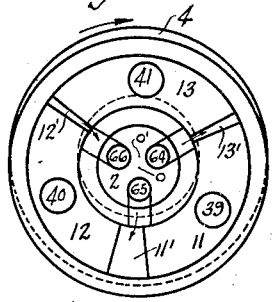
Figure 21:
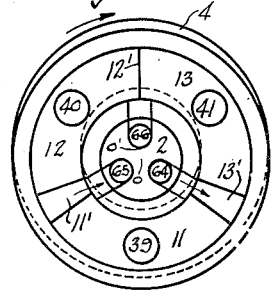
Figure 22:
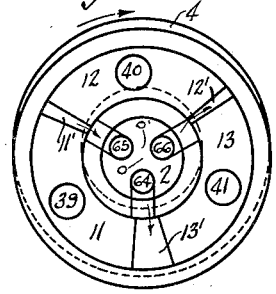
Figure 23:
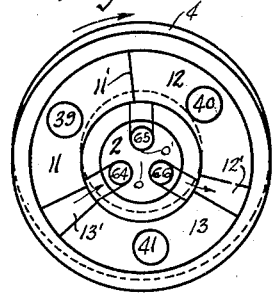

Let us assume that it is desired to operate the device as a pump and to so adjust the controls that fluid will be drawn into the same through chamber 76 and be discharged therefrom through chamber 77. Hand wheel 58 is first adjusted to actuate screw shaft 50 and sliding block 23 upwardly whereby the stroke adjusting plates 4, 4 will be moved to an eccentric position with respect to the central valve 2, the letter O indicating the center of rotation of the central valve and pumping unit, and O' the center of rotation of the stroke adjusting plates when actuated to full stroke position, as shown in Figs. 18 to 23. Fig. 18 shows the position of the parts when the sliding block has been so adjusted, and pin 39 is disposed directly above the axis of central valve 2. Figs. 19 to 23 inclusive show the positions of the parts as they rotate through 360 degrees of movement from the position shown in Fig. 18, each figure showing the changes which occur for a movement of substantially 60 degrees. It will be remembered that during operation of the pump the pumping elements 11, 12 and 13 function to successively draw fluid into the chambers 11', 12' and 13' disposed therebetween during substantially 180 degrees of movement and to successively discharge the fluid drawn into said chambers during the remaining substantially 180 degrees of movement. Thus, when the parts are in the position shown in Fig. 18, pumping element 12 is moving away from element 11, whereby fluid entering chamber 76 through port 84 will be drawn into chamber 11' through port 74, passage 65, and ports 68 and 71, as indicated by the arrows. Fluid will continue to be drawn into chamber 11' in this manner, as indicated in Figs. 19 and 20, until port 74 is covered by sealing plate 81. As port 74 passes beyond sealing plate 81, thereby establishing communication between chambers 11' and 77, pumping element 12 begins to move toward element 11, thereby forcing the fluid from chamber 11' into chamber 77 through ports 71, 68, passage 65 and port 74, as shown by the arrows in Figs. 21 and 22. Fluid will continue to be discharged in this manner until port 74 is covered by the upper sealing plate 80, at which time the ends of pumping elements 11 and 12 lie in substantially abutting relation, as shown in Fig. 23. The degree of movement imparted to pumping element 12 due to the eccentricity of the stroke adjusting plates 4, 4 gradually decreases as port 74 approaches sealing plates 80 and 81. The degree of movement intermediate these two points becomes progressively greater until a midway position is reached and then the movement decelerates until it passes the next transition point. As port 74 passes beyond sealing plate 80, pumping element 12 again begins to move away from element 11, as previously described, and the cycle of operation is repeated.

During the cycle of operation the pumping elements 12 and 13 also function to successively draw fluid from chamber 76 into the chambers 12' and 13' disposed therebetween, and to successively discharge it into chamber 77 through port 75, passage 66, ports 69 and 72, and port 73, passage 64 and ports 67 and 70, respectively, in the manner just described in connection with chamber 11'. This will become apparent upon inspection of Figs. 18 to 23 inclusive.

To reverse the discharge of the pump it is only necessary to actuate sliding block 23 downwardly so as to cause stroke adjusting plates 4, 4 to assume a position eccentric with central valve 2 at the opposite side thereof, as shown in Figs. 24 to 29 inclusive. The letter O'' now indicates the center of rotation of the stroke adjusting plates when the latter have been adjusted to full stroke position. The rotation of the pump will be in the same direction as before, as indicated by the arrows shown above these figures.

Figure 24:
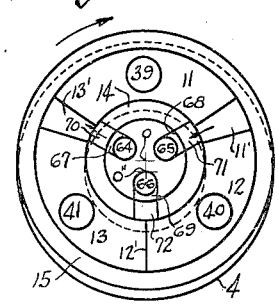
Figure 25:
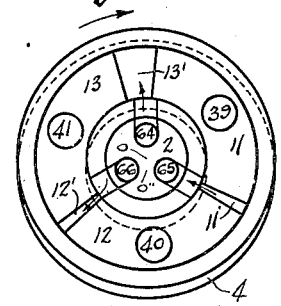
Figure 26:
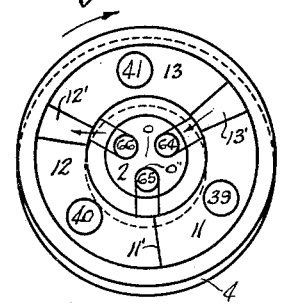
Figure 27:
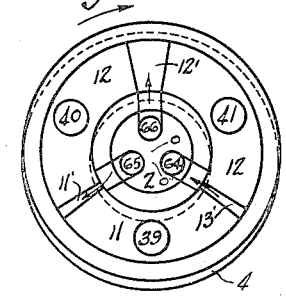
Figure 28:
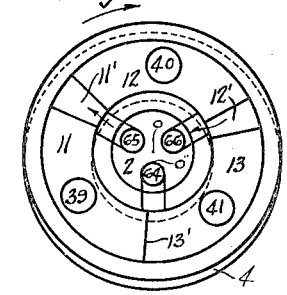
Figure 29:
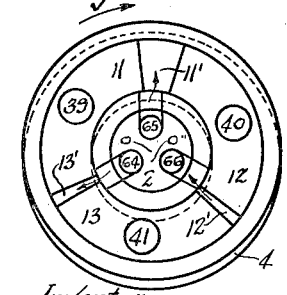

Figs. 24 to 29 inclusive also show the position of the parts at 60 degree intervals during a complete rotation of the central valve 2, pumping unit 3, and stroke adjusting plates 4, 4. When the stroke adjusting plates 4, 4 have been adjusted in this manner, however, as port 74 passes beyond the upper sealing plate 80, pumping element 12 will move toward element 11 to discharge the fluid previously drawn into the chamber 11', into chamber 76, through ports 71, 68, passage 65, and port 74, chamber 76 now becoming the pressure side of the pump. This continues, as shown in Figs. 24 to 26, until port 74 is closed by sealing plate 81, at which time pumping elements 11 and 12 will lie in substantially abutting relation. When port 74 passes beyond sealing plate 81, pumping element 12 begins to move away from element 11, whereupon fluid from chamber 77 is now drawn into chamber 11' through port 74, passage 65, and ports 68 and 71. This movement of pumping element 12 away from element 11 accelerates during the next 60 degrees of movement, as shown in Fig. 28, and then continues at a lesser rate, until port 74 is closed by the upper sealing plate 80, at which time but little movement is imparted to said element. As port 74 passes beyond the upper sealing plate 80, pumping element 12 again begins to move toward element 11 whereupon the fluid drawn into chamber 11' is discharged therefrom into chamber 76 through the communicating connections previously described. Pumping elements 12 and 13, and 13 and 11 operate in a similar manner to successively draw fluid from chamber 77 into chamber 12' and 13' respectively, during substantially 180 degrees of movement of central valve 2, and to discharge the fluid drawn into said chambers into chamber 76 during substantially the remaining 180 degrees of movement of said valve. This is apparent from Figs. 24 to 29, wherein it will be seen that as ports 75 and 73, respectively, pass beyond the lower sealing plate 81 fluid is drawn into the chambers 12' and 13', until said ports are covered by the upper sealing plate 80, at which time the pumping elements associated with the said chambers 12' and 13' function to discharge the fluid drawn therein into the pressure chamber 76 through the communicating passages associated therewith.

When it is desired to operate the device as a motor, it is simply placed on stroke in either direction, and fluid is then pumped into port 84 or 85, as the case may be, which fluid is conducted successively to the chambers 11', 12' and 13' during substantially 180 degrees of movement of valve 2, and is discharged therefrom during the remaining 180 degrees of movement of said valve. The fluid under pressure acting against the adjacent ends of elements 11, 12 and 13, has a tendency to force them apart. This movement is imparted to the stroke adjusting plates 4, 4, through pins 39, 40 and 41, and shoes 45, 45, thereby causing rotation of said stroke adjusting plates, which in turn, through its connection with plates 16, 16 and central valve 2, cause rotation of all of said parts.

Upon inspection of Figs. 18 to 29, it will be observed that the radial distances from the center of rotation of stroke adjusting plates 4, 4 and the respective pins 39, 40 and 41 are unequal when said plates are moved in either direction from a normal position. Consequently the moments of force acting on the plungers are unequal and the stroke adjusting plates will rotate in the direction of application of the greatest moment of force.

The right hand end 110 of central valve 2 projects outwardly from end plate 7 and may be operatively connected to an electric motor, or to any other suitable driving mechanism when the device is to be operated as a pump. When the device is to be operated as a motor portion 110 of central valve 2 becomes the drive shaft thereof.

Referring to Figs. 2, 12 and 13, it is seen that the ends of each of the plungers or pumping elements 39, 40 and 41 are provided with grooves 111 and 112. These grooves provide cylindrical chambers for the fluid when the ends of adjacent plungers lie in abutting relation and thereby prevent the formation of air pockets in the system.

It will also be observed upon reference to Figs. 3 and 18 to 29 that during portions of a complete rotation of the pump or motor both ends of each of the plungers are subjected to the same pressure and therefore at such times no load is imposed upon the associated pins 39, 40 or 41. This is accomplished by the construction and arrangement of the sealing members 80 and 81 in respect to the ports 73, 74 and 75 of central valve 2, as shown in Fig. 3. During portions of each rotation of the central valve 2 it is seen, for example, that ports 73 and 74 are in communication with the passage 76 at the same time, and later, during said rotation, said ports simultaneously communicate with passage 77. The same is true of ports 74, 75 and 75, 73. Thus, during such portions of a rotation of the central valve the chambers 13', 11', 11', 12' and 12', 13' are subjected to equal pressures and consequently the opposite ends of each of the plungers 11, 12 and 13 are successively subjected to equal pressures. As a result wear on such parts is reduced to a minimum. It is also seen that by providing double acting plungers which operate in a circular path concentric to the center of rotation of the central valve 2, the load upon the bearings for said central valve is also reduced to a minimum.

Figs. 30 and 31 show an operating plate 16' of an alternative construction. In this construction all of the slots 42', 43' and 44' provided therein are of a similar construction, and each is extended to permit relative movements between the pins operating therein and the operating plates 16'. By this construction the pins 39, 40 and 41 are successively engaged by the ends of said slots during a complete rotation of the central valve and as a result driving of the plungers and stroke adjusting plates by the plates 16' is effected through each of the pins rather than through a single pin, as is the case in the previously described construction shown in Figs. 4 and 5.

From the foregoing description it is seen that both ends of each of the pumping elements 11, 12 and 13 function to either draw in or discharge fluid during each complete revolution thereof. Each of the pumping elements are therefore double-acting, and are so disposed as to make the best use of the space available. Consequently highest capacities are obtained by the use of pumping elements of any given dimensions. It is also seen that the pumping elements 11, 12 and 13 are confined between rings 14 and 16, and between operating plates 16, 16 whereby relatively large bearing surfaces are provided, and as a result leakage of fluid past the pumping elements is reduced to a minimum. It will also be observed that elements 11, 12 and 13 are always concentric with the center of rotation of the pumping unit, and consequently no forces are imposed upon said elements which tend to distort them during operation. A perfect guide for these elements is thus maintained under all conditions of operation which reduces leakage to a minimum. It will also be observed that the strokes of the pumping elements are relatively great, and therefore the capacity of the pump is relatively great even though the dimensions of the pumping elements are relatively small.

While the drawings show a pump or motor employing but three plungers or pumping elements, it will be apparent to those skilled in the art that a larger number of plungers may be employed if it is so desired. Other modifications may also be made to the illustrative embodiments without departing from the invention. It therefore is to be understood that it is not intended to limit the invention thereto, but only by the scope of the claims which follow.

What is claimed is:

1. A pump or motor comprising, a rotary central valve having a series of longitudinally extending passages therein, radial ports provided at the opposite ends of each of said passages, a plunger unit secured to said central valve, said plunger unit comprising a ring having a series of ports therein registering with certain of the ports of said central valve, a series of plunger elements mounted on said ring, a pair of operating plates secured to said central valve and disposed at either side of said ring and plunger elements, a closing ring engaging the outer peripheries of said operating plates and said plunger elements, a pair of stroke adjusting plates having a series of radially disposed slots provided therein, one of said stroke adjusting plates being mounted adjacent each of said operating plates, a shoe mounted in each of said slots, a pin extending through each of said plunger elements, said operating plates, and said shoes, a sliding block, means for mounting said stroke adjusting plates in said sliding block, and means for adjusting said sliding block whereby said stroke adjusting plates will rotate eccentrically to the center of rotation of said central valve and plunger unit.

2. A fluid pump or motor comprising, a rotary distributing valve, a plunger assembly secured to said valve, said plunger assembly comprising a series of plungers adapted for relative movement in a circular path concentric with the center of rotation of said distributing valve and p. inger assembly, a pair of operating plates for said plungers mounted on either side thereof, one of said plungers being secured thereto, means providing lost motion between the other of said plungers and said operating plates, stroke adjusting means for said plungers adapted for movement about a center eccentric to that of said distributing valve and plunger assembly, and means for adjusting the eccentricity of said last mentioned means to vary the strokes of said plungers.

3. A fluid pump or motor comprising, a rotary distributing valve, a plunger unit mounted for rotation with said distributing valve, said plunger unit comprising a series of double-acting plungers operative in a circular path concentric with the center of rotation of said plunger unit and distributing valve, intake and discharge ports communicating with said distributing valve, ports provided in said distributing valve communicating with said intake and discharge ports, sealing means for preventing leakage of fluid between said intake and discharge ports, said sealing means being so disposed that during a portion of the rotation of said central valve and plunger unit both ends of each of said plungers will be subjected to equal pressures, whereby wear on the parts is reduced to a minimum.

4. A pump or motor comprising, a rotary distributing valve, a plunger unit mounted for rotation with said distributing valve, said plunger unit comprising a series of plungers operative in a circular path concentric with the center of rotation of said plunger unit and distributing valve, rotary stroke adjusting means adapted for rotation about an axis eccentric to that of said distributing valve and plugner unit, means operatively connecting said plungers to said stroke adjusting means, driving means for said plungers and stroke adjusting means having a lost motion connection with said connecting means, whereby driving of said plungers and stroke adjusting means is effected successively through each of said connecting means.

5. A fluid pump or motor comprising, a rotary distributing valve, having a series of longitudinally extending passages therein, radial ports provided near the opposite ends of each of said passages, a plunger unit mounted for rotation with said distributing valve and disposed adjacent the ports provided at one end thereof, means connecting the ports at the other end of said distributing valve to a source of fluid supply, said plunger unit including means defining an annular chamber communicating with said ports first named, a series of plungers provided in said annular chamber and disposed between said ports, means for operating said plungers toward and away from each other during a complete rotation of said distributing valve and plunger unit whereby fluid from said source of supply is drawn between pairs of said plungers and discharged therefrom during each rotation of said plunger unit and distributing valve, and means for varying the strokes of said plungers.

6. A fluid pump or motor comprising, a rotary distributing valve, having a series of longitudinally extending passages therein, radial ports provided near the opposite ends of each of said passages, a plunger unit mounted for rotation with said distributing valve and disposed adjacent the ports provided at one end thereof, means connecting the ports at the other end of said distributing valve to a source of fluid supply, said plunger unit including means defining an annular chamber communicating with said ports first named, a series of plungers provided in said annular chamber and disposed between said ports, means for operating said plungers toward and away from each other during a complete rotation of said distributing valve and plunger unit whereby fluid from said source of supply is drawn between pairs of said plungers and discharged therefrom during each rotation of said plunger unit and distributing valve, means for varying the strokes of said plungers, and means operatively connecting said last mentioned means to said operating means.

7. A pump or motor comprising, a rotary central distributing valve having a series of longitudinally extending passages therein, radial ports provided at the opposite ends of each of said passages, a plunger unit mounted for rotation with said distributing valve and disposed adjacent the ports provided at one end thereof, means connecting the ports at the other end of said distributing valve to a source of fluid supply, said plunger unit comprising a ring having a series of ports therein registering with the ports first named, a series of plunger elements mounted on said ring and disposed between said ports, a pair of operating plates secured to said central distributing valve and disposed at either side of said ring and plunger elements, a closing ring engaging the outer peripheries of said operating plates and plunger elements and forming with said ring first named, an annular chamber in which said plunger elements operate, a pair of stroke adjusting plates having a series of radially disposed slots provided therein, one of said stroke adjusting plates being mounted adjacent each of said operating plates, a shoe mounted in each of said slots, a pin extending through each of said plunger elements, said operating plates and said shoes, a sliding block, means for rotatably mounting said stroke adjusting plates in said sliding block, and means for adjusting said sliding block in either direction from a neutral position whereby said stroke adjusting plates will rotate eccentrically to the rotation of said central distributing valve and plunger unit to actuate said plunger elements toward and away from each other during a complete rotation thereof, causing fluid from said source of supply to be drawn between pairs of said plungers and discharged therefrom during each rotation of said plunger unit, distributing valve and stroke adjusting plates.

HENRY W. LANDENBERGER.